United States Patent
Calviño

(10) Patent No.: US 8,544,508 B2
(45) Date of Patent: Oct. 1, 2013

(54) TELESCOPING TUBE FOR TRANSFERRING FUEL

(75) Inventor: Ricardo Fernández Calviño, Getafe (ES)

(73) Assignee: EADS Construcciones Aeronauticas, S.A., Madrid (ES)

( * ) Notice: Subject to any disclaimer, the term of this patent is extended or adjusted under 35 U.S.C. 154(b) by 618 days.

(21) Appl. No.: 12/720,540

(22) Filed: Mar. 9, 2010

(65) Prior Publication Data

US 2011/0147527 A1 Jun. 23, 2011

(30) Foreign Application Priority Data

Dec. 17, 2009 (ES) .................................... 200931183

(51) Int. Cl.
*B67C 3/26* (2006.01)
(52) U.S. Cl.
USPC ........... 141/284; 141/231; 141/266; 141/388; 285/302; 244/135 A; 361/218
(58) Field of Classification Search
USPC .................. 244/135 A, 135 R; 361/218, 212; 285/302; 141/46, 231, 250, 263, 266, 284, 141/312, 385, 388
See application file for complete search history.

(56) References Cited

U.S. PATENT DOCUMENTS

| | | | |
|---|---|---|---|
| 1,780,693 A * | 11/1930 | Yazel | 285/9.2 |
| 2,663,523 A | 12/1953 | Leisy | |
| 3,783,178 A * | 1/1974 | Philibert et al. | 174/86 |
| 4,357,860 A * | 11/1982 | Krzak | 454/71 |
| 4,540,144 A | 9/1985 | Perrella | |
| 6,983,957 B2 * | 1/2006 | Bettinger | 285/302 |
| 7,612,979 B2 | 11/2009 | Sequeiros Murciano et al. | |
| 2007/0257154 A1 | 11/2007 | Kwok et al. | |

* cited by examiner

*Primary Examiner* — Jason K Niesz
(74) *Attorney, Agent, or Firm* — Seed IP Law Group PLLC

(57) ABSTRACT

A telescoping tube for fuel transfer operations has a fixed part and a moving part, the moving part further having a dynamic sealing system which guarantees the sealing of the moving part against the fixed part, a cushioning system which absorbs the energy of the impact of the moving part against the fixed part in operations for extending and retracting the tube and protection systems against electrical discharges which ground the moving part to the fixed part, the aforementioned dynamic sealing, cushioning and protection systems all being incorporated in a single unit in the moving part of the telescoping tube. Additionally, the invention relates to an in-flight refuelling system for a tanker aeroplane, to carry out in-flight fuel transfer operations to a receiving aircraft, having a telescoping tube with the abovementioned characteristics.

9 Claims, 2 Drawing Sheets

TELESCOPING TUBE FOR TRANSFERRING FUEL

FIELD OF THE INVENTION

This invention relates to a telescoping tube configuration for refuelling or fuel transfer systems. More particularly, it relates to a telescoping tube configuration for systems for in-flight refuelling and fuel transfer between a tanker aeroplane and a receiving aircraft.

BACKGROUND

One of the methods currently used for refuelling operations or transferring fuel comprises a telescoping tube, which in turn comprises a fixed part and a moving part, this moving part being capable of being extended telescopically with respect to the fixed part, carrying out the transfer of fuel from one tank to another in this manner. This telescoping tube usually comprises a system for extending and retracting its fixed part with respect to the moving part, such that the aforementioned telescoping extension and retraction can be achieved and enabling it to be stopped at nominal positions without reaching limits at which impact occurs. On certain occasions, when the aforementioned extension and retraction system fails, it is necessary for the moving part to be capable of locking against the fixed part, the former cushioning the impact that this action involves, so as to prevent the failure of the refuelling system.

On the other hand, given that there will be a transfer of fuel in the extended tube, between its fixed and moving parts, it is necessary that the sealing of the moving part relative to the fixed part is correct and that there are no fuel leaks. There is, therefore, the need for an effective dynamic seal.

Furthermore, and given that what is transferred is highly inflammable fuel, the telescoping tube needs to be perfectly designed to protect it during operation from possible electrical discharges or electric arcs due, for example, to lightning strikes or to the accumulation of electrostatic charge due to different types of friction which can occur in certain fuel transfer operations.

One of the methods currently used for in-flight refuelling operations for an aircraft is based on the use of an arm or mast device known as a boom, which comprises a telescoping tube with a fixed part and a moving part as described above, it being possible for this moving part to extend telescopically with respect to the fixed part, carrying out the transfer of fuel from the tanker aeroplane to the receiving aeroplane in this way. The aforementioned boom is in turn connected to the tanker aeroplane by means of an articulated system.

A specific system is known, from U.S. Ser. No. 11/411,984 from the same applicant, for protection against electrical discharges of an aircraft telescoping tube for in-flight refuelling. The aforementioned system comprises insulating media and low conductivity media to reduce the current from lightning strikes and to discharge the static charge created during refuelling, in addition to conducting media to provide a safe path for lightning currents and good earthing for the electrostatic charge. The aforementioned system is specifically for protection against electrical discharges.

Also known, from US document 2007/0257154, is a system to protect against electrical discharges, particularly those from lightning striking an aircraft during in-flight refuelling operations between a tanker aeroplane and a receiving aeroplane. This system is based on injecting an inert gas into the zone adjoining the refuelling zone such that the fuel which may escape to the outside does not ignite in the case of a lightning strike on either of the two aircraft. The aforementioned system is also specifically for protection against electrical discharges.

Also known, on the other hand, are cushioning, separation and sealing systems for an aircraft telescoping tube for carrying out in-flight refuelling operations, such as those described in U.S. Pat. No. 4,540,144, for example. Described in this document is a telescoping tube which performs in-flight refuelling operations, which comprises a system for the extension and retraction of the tube, together with a housing to separate this system from the exterior, the system also comprising means for blocking the telescoping tube in its retracted position. Such a system does not comprise specific means for protection against electrical discharges.

Hence, the integration of elements or means for performing the aforementioned actions of dynamic sealing, cushioning and protection against electrical discharges are usually carried out by integrating different units to perform the aforementioned actions into the moving part of the telescoping tube, involving an increase in the weight and length of the moving part and, consequently, of the telescoping tube as a whole, with this increase compromising the functions and dimensions of this telescoping tube.

As such, the purpose of this invention is to resolve the aforementioned problems.

SUMMARY OF THE INVENTION

As such, this invention relates, as a first aspect, to the configuration of a moving part of a telescoping tube for carrying out fuel transfer operations. This moving part comprises means for dynamic sealing, means for cushioning and means for protection against electrical discharges, such that the aforementioned means are integrated into a single unit in the moving part of the telescoping tube, so providing the aforementioned moving part with all these characteristics in a compact form, with the minimum weight and in the minimum length.

The moving part of the telescoping tube as per the invention comprises a pipe support which serves as an interface between the moving and fixed parts of the telescoping tube, the means for sealing, cushioning and protection against discharges being located in this pipe support. In addition, the moving part of the telescoping tube in the invention comprises a tractor pipe which serves to connect the moving part to the telescoping tube's extension and retraction system.

The means for dynamic sealing comprise in turn dynamic sealing joints which are housed in the telescoping tube's pipe support, these means of dynamic sealing making the seal between the fixed part of the telescoping tube and the pipe support for its moving part, during the whole movement of the moving part over the fixed part, in fuel transfer operations. The dynamic sealing joints form the boundary between the dry zone and the wet zone of the telescoping tube's pipe support, the wet zone being that which is upstream of the successive dynamic sealing joints and the dry zone being that where fuel must not be present between the fixed and moving parts of the telescoping tube, downstream of the successive dynamic sealing joints.

The means of cushioning are those charged with absorbing the energy from shocks between the moving part and the fixed part of the telescoping tube, both on extending and retracting the latter, as well as on those occasions when the telescoping tube's extension and retraction system fails. These means of cushioning comprise in turn fixed stops and dynamic stops, both types installed on the telescoping tube's pipe support, cushioning elements in turn cooperating with the dynamic stops, where the former absorb part of the energy from the collision between the dynamic stops and external stops on the telescoping tube.

The invention's means of protecting the telescoping tube against electrical discharges are those entrusted with earthing the moving part of the telescoping tube to the fixed part by means of conducting rings. On the other hand, these means are those entrusted with preventing electric arcs between the moving and fixed parts of the tube by means of insulating sleeves. Additionally, both the pipe support and the aforementioned insulating sleeves need to be sufficiently conductive, on the one hand, to enable the static electricity accumulated by friction between the moving part and the fixed part of the telescoping tube to be discharged and, on the other hand, sufficiently insulating to prevent electric arcs between the fixed and moving parts of the tube.

According to a second aspect, the invention relates to an in-flight refuelling system for a tanker aeroplane, to carry out in-flight fuel transfer operations to a receiving aircraft, this system comprising a telescoping tube with the abovementioned characteristics.

Other characteristics and advantages of this invention will emerge from the detailed description which follows in relation to the accompanying figures.

DETAILED DESCRIPTION OF THE INVENTION

Figure 1:
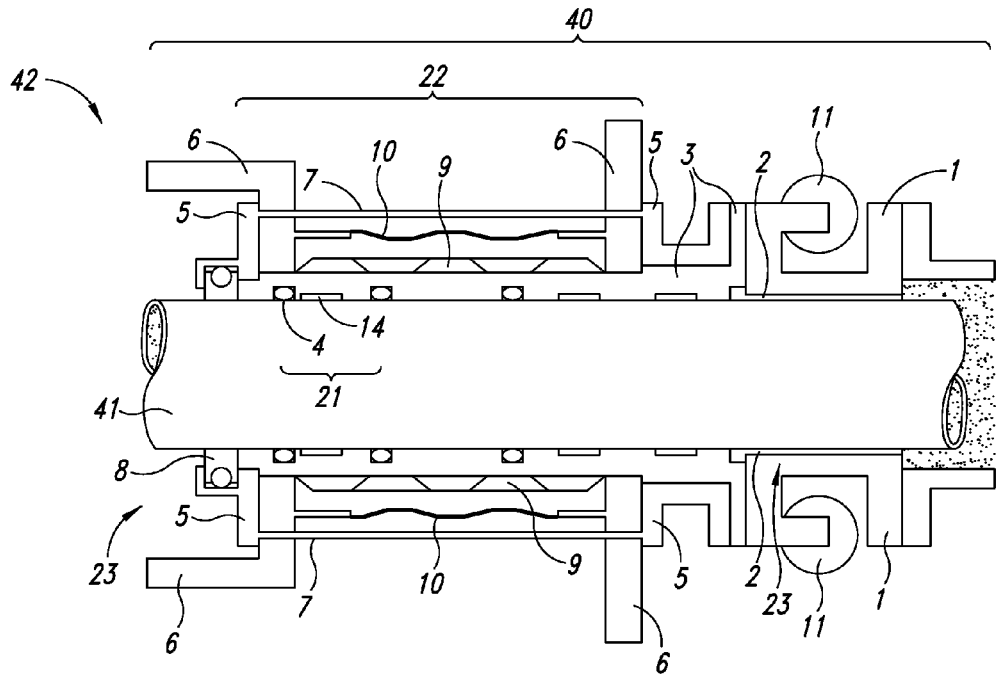
FIG. 1 shows a diagram in section of the configuration of the moving part of the telescoping tube to carry out fuel transfer operations, as per the invention.

According to a first aspect, this invention relates to the configuration of a moving part 40 of a telescoping tube 42 for carrying out fuel transfer operations. This moving part 40 comprises means for dynamic sealing 21, means for cushioning 22 and means for protection 23 against electrical discharges, such that the aforementioned means 21, 22 and 23 are integrated into a single unit in the moving part 40 of the telescoping tube 42, so providing the aforementioned moving part 40 with all these characteristics in a compact form, with the minimum weight and in the minimum length.

The moving part 40 of the telescoping tube 42 as per the invention comprises a pipe support 3, preferably made from a rigid non-metallic material, which serves as an interface between the moving part 40 and fixed part 41 of the telescoping tube 42, the means for sealing 21, cushioning 22 and protection 23 against discharges being located in this pipe support 3. In addition, the moving part 40 of the telescoping tube 42 as per the invention comprises a tractor pipe 1 which serves to connect the moving part 40 to the telescoping tube's extension and retraction system.

The telescoping tube 42 of the invention comprises at least one moving part 40 and one fixed part 41. As this tube 42 is used to transfer fuel, it is essential to guarantee correct sealing between the two parts, 40 and 41. As such, one of these parts needs to contain the dynamic sealing joints 4, while the other needs to contain a surface on which the aforementioned joints 4 are to seal. Taking the length of the telescoping tube 42 into account, it is preferable to prepare a cylindrical external surface than an internal surface. As the fixed part 41 is what is inserted into the moving part 40 when the moving part 40 is retracted, the external surface of the fixed part 41 is what needs to be prepared for the aforementioned sealing. Hence, the moving part 40 needs to house the dynamic sealing joints 4 in its internal end closest to the fixed part 41, as shown in FIG. 1. This seal needs to include guiding elements 14 associated with the dynamic sealing joints 4, which work with different pressures and at different speeds of the moving part. In this manner, the assembly formed by the dynamic joints 4 and the guiding elements 14 associated with the former provide a dynamic-type sealing system.

The means for dynamic sealing 21 as such comprise dynamic sealing joints 4 associated with guiding elements 14, the aforementioned means 21 being housed in the pipe support 3 of the telescoping tube 42, so constituting a dynamic sealing solution between the fixed part 41 of the telescoping tube 42 and the pipe support 3 of its moving part 40 during full movement of the moving part 40 over the fixed part 41 in fuel transfer operations.

The means of cushioning 22 are those entrusted with absorbing the energy from shocks between the moving part 40 and the fixed part 41 of the telescoping tube 42, both on extending and retracting the latter, as well as on those occasions when the telescoping tube's 42 extension and retraction system fails. These means of cushioning 22 comprise in turn fixed stops 5 and dynamic stops 6, both types installed on the telescoping tube's 42 pipe support 3, cushioning elements 9 in turn cooperating with the dynamic stops 6, where the former absorb part of the energy from the collision between the dynamic stops 6 and external stops 60 on the telescoping tube 42. These cushioning elements 9 may be elastic elements (for example springs or pawls), which are capable of absorbing energy and transforming it into elastic potential energy, or other types of elements which are capable of absorbing energy. Preferably, these cushioning elements 9 will be friction rings 9, capable of absorbing a large amount of energy with minimal deformation, which will enable the configuration of the moving part 40 of the telescoping tube 42 to be more compact, with minimum weight in the minimum length, in the interests of which the aforementioned means 21, 22 and 23 are integrated into a single unit. The friction rings 9 will be installed with minimum compression on the pipe support 3.

Between the fixed stops 5 and the dynamic stops 6, both preferably metallic, there is a separating element in a non-metallic material to prevent the impact being metal-on-metal.

So, as per the invention, the following are installed on the pipe support 3 for the configuration of the moving part 40 of the telescoping tube 42:
   the fixed stops 5 for the means of cushioning 22, which limit the action or delimit the zone of action or run of the dynamic stops 6 for these means 22;
   the dynamic stops 6 for the means of cushioning 22, which move within the zone delimited by the fixed stops 5, compressing or not compressing the friction rings 9 which are what absorbs the energy, cushioning the impact of these dynamic stops 6 against external stops 60 on the telescoping tube 42;
   the external stops 60 or fixed stops of the fixed part 41, against which the dynamic stops 6 of the means of cushioning 22 impact, causing these dynamic stops 6 to move and compress the friction rings 9, which are obliged to overlap and deform, so absorbing energy.

The fact that the means of cushioning 22, which comprise the dynamic stops 6, the fixed stops 5 and the friction rings 9, are arranged on the pipe support 3 of the moving part 40 of the telescoping tube 42 helps to obtain a more compact configuration of the moving part 40 of the telescoping tube 42, with minimum weight and minimum length.

The fixed stops 5 are solidly connected to the pipe support 3 and, joined to them, guides 7 for the dynamic stops 6 are installed, which permit both their alignment and their longitudinal movement between the fixed stops 5 (FIG. 1). Some friction rings 9 are housed between the dynamic stops 6, which absorb at least part of the energy from the impact between the dynamic stops 6 and external stops 60 on the telescoping tube 42. These rings 9 are protected by a protective cover 10 connected to the dynamic stops 6. The pipe support 3 enables the dynamic sealing joints 4 to be housed between the moving part 40 of the telescoping tube 42 and the fixed part 41 of the latter. The dynamic joints 4 form the boundary between the dry zone and the wet zone of the pipe support 3, as detailed below. The telescoping tube 42 for fuel transfer as per the invention is an aerodynamic excrescence exposed to external agents. In particular, due to its shape, it can act as a lightning conductor, hence it is essential for it to comprise elements which earth it to ensure electrical continuity between the metal parts and prevent metal-to-metal contacts and electric arcs in wet zones.

As such, the means of protection 23 against electrical discharges for the invention's telescoping tube 42 perform the following complementary functions in the invention:

On the one hand, they are entrusted with "earthing" the moving part 40 of the telescoping tube 42 to the fixed part 41, enabling electrical continuity between the fixed part 41 and the moving part 40 of the telescoping tube 42 to discharge charges due, for example, to lightning or accumulations of any type: this is achieved by means of the conducting rings 8, with the special feature that this takes place in a zone, called the dry zone, where no fuel can be present between the fixed part 41 and the moving part 40 of the tube 42 which would make this discharge dangerous, given that it takes place downstream of the successive sealing joints 4;

on the other hand, they are entrusted with preventing electric arcs between the moving part 40 and the fixed part 41 of the tube 42 by means of insulating sleeves 2, made preferably from a rigid non-metallic material; these electric arcs take place in the so-called wet zone (upstream of the successive sealing joints 4), insulating sleeves 2 being installed for this reason which, in spite of being insulating, need to have a degree of conductivity so that electrostatic charge does not accumulate due to friction as the moving part 40 of the telescoping tube 42 moves with respect to the fixed part 41.

As such, both the pipe support 3 and the aforementioned insulating sleeves 2 need to be sufficiently conductive, on one hand, to enable the static electricity accumulated by friction between the moving part 40 and the fixed part 41 of the telescoping tube 42 to be discharged and, on the other hand, sufficiently insulating to prevent electric arcs between the fixed 41 and moving 40 parts of the tube 42, that is to say, downstream of the dynamic joints 4 (wet zone). Preferably, the resistance of the pipe support 3 and the aforementioned insulating sleeves 2 will lie between 1 k$\Omega$ and 10 M$\Omega$.

On the other hand, the conducting rings 8 need to be sufficiently conductive as to "earth" the moving part 40 of the telescoping tube 42 to the fixed part 41, channelling the current upstream of the dynamic joints 4 (dry zone). The resistance of the conducting rings 8 will preferably lie between 10 m$\Omega$ and 2 $\Omega$.

As has been stated, downstream of the dynamic joints 4 there is the wet zone where the tractor pipe 1 is housed, this being an element linked to the extension and retraction system for the telescoping tube 42, on which guide rollers 11 are installed which help align the moving part 40 of the telescoping tube 42.

The moving part 40 of the tube 42 is connected to the extension and retraction system for the telescoping tube 42 (not shown), this connection being made at the internal end closest to the fixed part 41 where the system's mechanical parts are located.

Hence, during the extension and retraction of the moving part 40, this moving part 40 needs to slide over rollers (not shown) which support the loads acting on the telescoping tube 42. These rollers are installed in the fixed part 41 in a position which enables them to support the moving part 40 when this is extended. However, when the moving part 40 is retracted, its internal end moves away from these rollers, hence auxiliary rollers 11 are necessary to guide it.

In summary, the configuration of the moving part 40 of the telescoping tube 42 for carrying out fuel transfer operations, as per the invention, has the following characteristics:

it permits sealing between the moving part 40 and the fixed part 41;

it permits metal-to-metal contact between the moving part 40 and the fixed part 41 to be isolated and prevented;

it earths the moving part 40 to the fixed part 41;

it connects the moving part 40 to the extension and retraction system for the fixed part 41;

it guides the moving part 40 over the fixed part 41;

it permits the moving part 40 to stop against the fixed part 41 when the extension and retraction system for the tube 42 fails;

it cushions the impact of the moving part 40 against the fixed part 41 when the extension and retraction system for the tube 42 fails;

The integration of the means for sealing 21, means of cushioning 22 and means of protection against discharges 23 into the moving part 40 is achieved as per the invention by means of a single unit which incorporates all the above characteristics in the minimum weight and length of the aforementioned moving part 40 of the telescoping tube 42.

Also, as a summary, the configuration of the moving part 40 of the tube 42 as per the invention comprises the following elements or components built into the aforementioned means for sealing 21, means of cushioning 22 and means of protection against discharges 23:

a tractor pipe 1 to which the extraction and retraction system for the tube 42 is connected;

an insulating sleeve 2 which prevents metal-to-metal contact between the moving part 40 and the fixed part 41 of the tube 42;

dynamic sealing joints 4 which guarantee sealing of the moving part 40 to the fixed part 41;

a pipe support 3 which houses the dynamic sealing joints 4;

fixed stops 5 which limit the operation of dynamic stops 6;

dynamic stops 6 which impact against the fixed stops 5 on the fixed part 41 of the tube 42;

guides 7 for the dynamic stops 6, which guide the dynamic stops 6 during the impact of the moving part 40 on the fixed part 41;

a conducting ring 8 which earths the moving part 40 to the fixed part 41;

friction rings 9 which cushion the impact of the dynamic stops 6 against the fixed stops 5;
a protective cover 10 which protects the friction rings 9;
guide rollers 11 which guide the moving part 40 when it is retracted.

Figure 2:
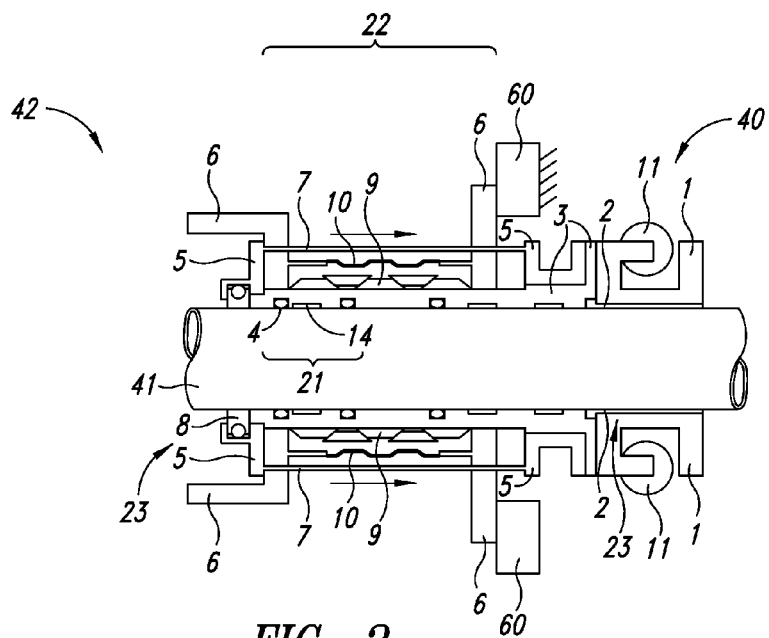
FIG. 2 shows a diagram in section of the position of the dynamic stops in the configuration of the telescoping tube's moving part as per the invention, in the operation of extending the moving part of the aforementioned tube.
Figure 3:
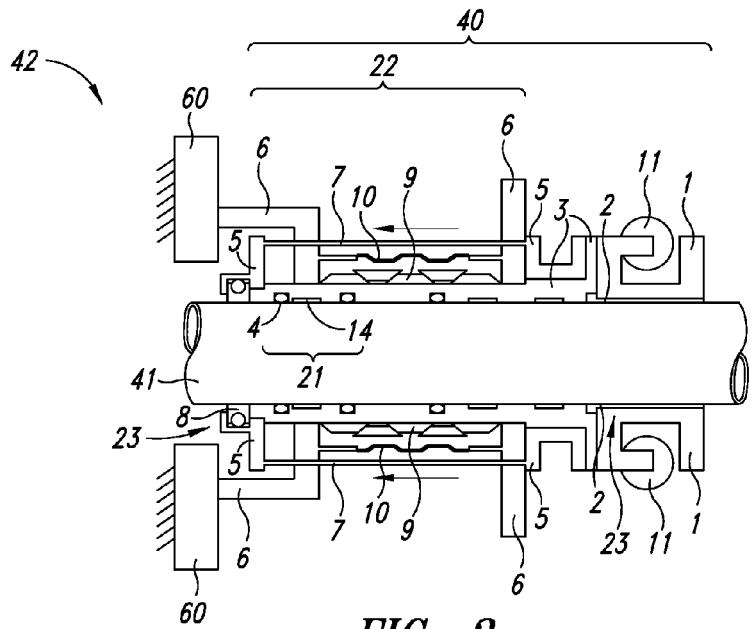
FIG. 3 shows a diagram in section of the position of the dynamic stops in the configuration of the telescoping tube's moving part as per the invention, in the operation of retracting the moving part of the aforementioned tube.
Figure 4:
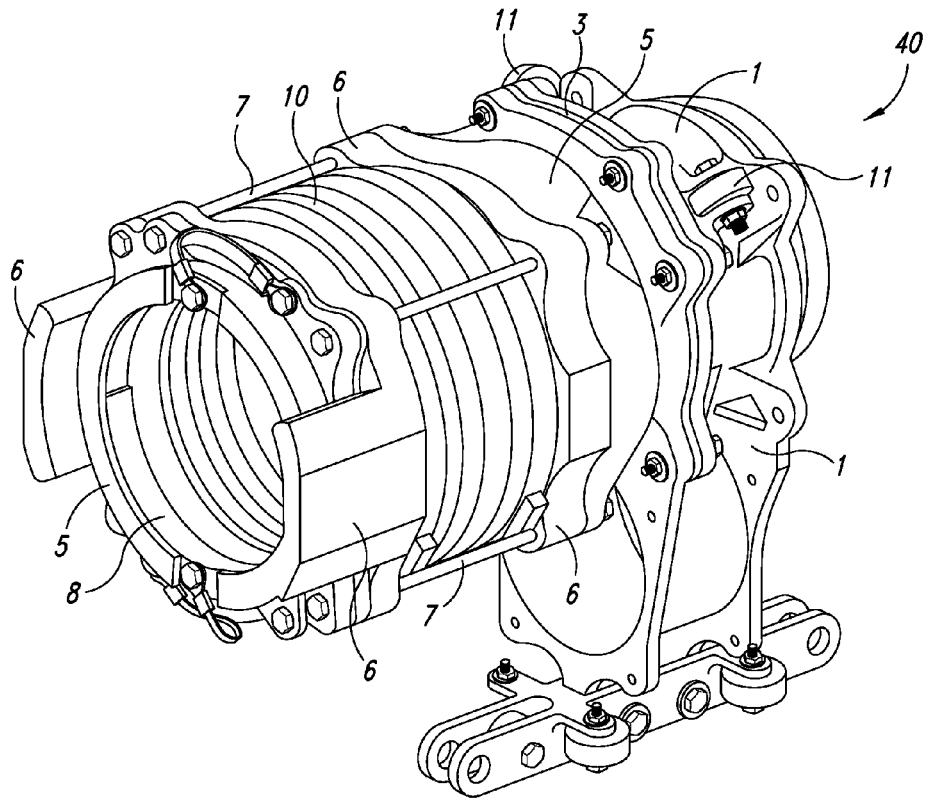
FIG. 4 shows a detailed diagram of the configuration of the moving part of the telescoping tube to carry out fuel transfer operations, as per the invention.

FIGS. 2 and 3 show the position of the dynamic stops 6 on impacting during the extension and retraction, respectively, of the moving part 40 over the fixed part 41, compressing the friction rings 9 which cushion this impact.

According to a second aspect, the invention relates to an in-flight refuelling system for a tanker aeroplane, to carry out in-flight fuel transfer operations to a receiving aircraft, this system comprising a telescoping tube 42 with the abovementioned characteristics.

Although this invention has been described entirely in connection with preferred embodiments, it is clear that those modifications within the scope of the following claims can be introduced, without considering this scope limited by the aforementioned embodiments.

The invention claimed is:

1. A telescoping tube to carry out fuel transfer operations, the telescoping tube comprising:
   a fixed part including external stops; and
   a moving part, the moving part comprising
      a dynamic seal to seal the moving part against the fixed part, the dynamic seal including dynamic sealing joints associated with guiding elements, which provide a dynamic-type sealing system,
      a cushioning arrangement to absorb at least some of the energy of the impact of the moving part against the external stops of the fixed part in operations for extending and retracting the telescoping tube, and
      a grounding arrangement to protect against electrical discharges which ground the moving part to the fixed part, and
      wherein the dynamic seal, the cushioning arrangement and the grounding arrangement are all incorporated in a single unit.

2. A telescoping tube to carry out fuel transfer operations, the telescoping tube comprising:
   a fixed part including external stops; and
   a moving part, the moving part comprising
      a dynamic seal to seal the moving part against the fixed part,
      a grounding arrangement to protect against electrical discharges which ground the moving part to the fixed part, and
      a cushioning arrangement to absorb at least some of the energy of the impact of the moving part against the external stops of the fixed part in operations for extending and retracting the telescoping tube, the cushioning arrangement including
         fixed stops,
         dynamic stops, and
         cushioning elements cooperating with the dynamic stops to absorb at least some of the energy from impacts between the dynamic stops and the external stops of the fixed part, the cushioning elements including friction rings capable of absorbing energy from impacts between the dynamic stops and external stops during operation, with minimum deformation, and
      wherein the dynamic seal, the cushioning arrangement and the grounding arrangement are all incorporated in a single unit.

3. A telescoping tube to carry out fuel transfer operations, the telescoping tube comprising:
   a fixed part including external stops; and
   a moving part, the moving part comprising
      a dynamic seal to seal the moving part against the fixed part,
      a grounding arrangement to protect against electrical discharges which ground the moving part to the fixed part, and
      a cushioning arrangement to absorb at least some of the energy of the impact of the moving part against the external stops of the fixed part in operations for extending and retracting the telescoping tube, the cushioning arrangement including
         fixed stops,
         dynamic stops,
         cushioning elements cooperating with the dynamic stops to absorb at least some of the energy from impacts between the dynamic stops and the external stops of the fixed part, and
         a separating element of a non-metallic material provided between the fixed stops and the dynamic stops, and
      wherein the dynamic seal, the cushioning arrangement and the grounding arrangement are all incorporated in a single unit.

4. A telescoping tube to carry out fuel transfer operations, the telescoping tube comprising:
   a fixed part including external stops; and
   a moving part, the moving part comprising
      a dynamic seal to seal the moving part against the fixed part,
      a grounding arrangement to protect against electrical discharges which ground the moving part to the fixed part, and
      a cushioning arrangement to absorb at least some of the energy of the impact of the moving part against the external stops of the fixed part in operations for extending and retracting the telescoping tube, the cushioning arrangement including
         fixed stops,
         dynamic stops,
         cushioning elements cooperating with the dynamic stops to absorb at least some of the energy from impacts between the dynamic stops and the external stops of the fixed part, and
         guides connected to the fixed stops which permit the alignment and longitudinal movement of the dynamic stops between the fixed stops, and
      wherein the dynamic seal, the cushioning arrangement and the grounding arrangement are all incorporated in a single unit.

5. A telescoping tube to carry out fuel transfer operations, the telescoping tube comprising:
   a fixed part including external stops; and
   a moving part, the moving part comprising
      a dynamic seal to seal the moving part against the fixed part,
      a cushioning arrangement to absorb at least some of the energy of the impact of the moving part against the external stops of the fixed part in operations for extending and retracting the telescoping tube; and
      a grounding arrangement to protect against electrical discharges which ground the moving part to the fixed part, the grounding arrangement including an insulating sleeve to prevent electric arcs in a wet zone of the telescoping tube; and wherein the dynamic seal, the cushioning arrangement and the grounding arrangement are all incorporated in a single unit.

6. A telescoping tube according to claim 5, in which the insulating sleeve has a sufficient conductivity to prevent the accumulation of electrostatic charge due to friction from displacement of the moving part of the telescoping tube with respect to the fixed part.

7. A telescoping tube according to claim 6, in which the insulating sleeve has a resistance of 1 kΩ-10 MΩ.

8. A telescoping tube to carry out fuel transfer operations, the telescoping tube comprising:
   a fixed part including external stops;
   a moving part, the moving part comprising
      a dynamic seal to seal the moving part against the fixed part,
      a grounding arrangement to protect against electrical discharges which ground the moving part to the fixed part, and
      a cushioning arrangement to absorb at least some of the energy of the impact of the moving part against the external stops of the fixed part in operations for extending and retracting the telescoping tube; and
   auxiliary rollers coupled to the moving part which guide the moving part of the telescoping tube when the telescoping tube is retracted.

9. A system for in-flight refueling for a tanker airplane to carry out in-flight fuel transfer operations to a receiving aircraft, the system comprising a telescoping tube having:
   a fixed part including external stops; and
   a moving part, the moving part comprising
      a dynamic seal to seal the moving part against the fixed part,
      a grounding arrangement to protect against electrical discharges which ground the moving part to the fixed part, and
      a cushioning arrangement to absorb at least some of the energy of the impact of the moving part against the external stops of the fixed part in operations for extending and retracting the telescoping tube, and
   wherein the dynamic seal, the cushioning arrangement and the grounding arrangement are all incorporated in a single unit.

* * * * *